US008411305B2

(12) United States Patent
Giannetti (10) Patent No.: US 8,411,305 B2
(45) Date of Patent: Apr. 2, 2013

(54) SYSTEM AND METHOD FOR IDENTIFYING A RECORD TEMPLATE WITHIN A FILE HAVING REUSED OBJECTS

(75) Inventor: Fabio Giannetti, Los Gatos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 759 days.

(21) Appl. No.: 12/606,682

(22) Filed: Oct. 27, 2009

(65) Prior Publication Data

US 2011/0096356 A1 Apr. 28, 2011

(51) Int. Cl.
*G06F 3/12* (2006.01)

(52) U.S. Cl. ........... 358/1.15; 358/1.13; 358/1.18; 358/462; 707/602; 707/739; 715/221; 715/249

(58) Field of Classification Search ............ 358/1.13, 358/1.15, 1.18, 1.5, 462; 382/209, 317; 700/221; 707/602, 739; 715/205, 210, 221, 249
See application file for complete search history.

(56) References Cited

U.S. PATENT DOCUMENTS

| | | | | |
|---|---|---|---|---|
| 5,859,711 A * | 1/1999 | Barry et al. | | 358/296 |
| 6,073,148 A * | 6/2000 | Rowe et al. | | 715/205 |
| 6,202,727 B1 * | 3/2001 | Yisha et al. | | 156/538 |
| 2003/0189726 A1 * | 10/2003 | Kloosterman et al. | | 358/1.18 |
| 2005/0125728 A1 * | 6/2005 | Peiro et al. | | 715/523 |
| 2005/0270573 A1 * | 12/2005 | Ferlitsch | | 358/1.15 |
| 2007/0027882 A1 * | 2/2007 | Kulkarni | | 707/100 |
| 2007/0133067 A1 * | 6/2007 | Garg | | 358/462 |
| 2007/0195368 A1 * | 8/2007 | Waara | | 358/1.18 |
| 2008/0027895 A1 * | 1/2008 | Combaz | | 707/1 |
| 2008/0037061 A1 * | 2/2008 | Okada | | 358/1.15 |
| 2009/0185241 A1 * | 7/2009 | Nepomniachtchi | | 358/474 |
| 2010/0027052 A1 * | 2/2010 | Ferlitsch | | 358/1.15 |

* cited by examiner

*Primary Examiner* — King Poon
*Assistant Examiner* — David S Cammack (57) ABSTRACT

A system and method is disclosed for identifying a record template within a file having reused objects. The method discloses: identifying, in the input file, a reused object and a set of pages upon which the reused object is located; computing a page distance between at least two adjacent instances of the reused object; generating an object recurrence pattern for the reused object; and reconstructing a record template, based on the object recurrence pattern, thereby identifying the records in the input file. The system discloses a processor, a profiler module, a pattern identification module, and a template reconstruction module for effecting the method.

25 Claims, 3 Drawing Sheets

SYSTEM AND METHOD FOR IDENTIFYING A RECORD TEMPLATE WITHIN A FILE HAVING REUSED OBJECTS

BACKGROUND OF THE INVENTION

1. Field of the Invention

The present invention relates generally to systems and methods for parsing files, and more particularly toward identifying records within a file.

2. Brief Background Introduction

Files which do not contain explicit information which differentiates their internal record structure are quite ubiquitous in many environments. Such a lack of internal record differentiation, however, substantially increases the costs of processing and utilizing such files.

BRIEF DESCRIPTION OF THE DRAWINGS

Some embodiments of the invention are described, by way of example, with respect to the following figures.

DETAILED DESCRIPTION OF THE PREFERRED EMBODIMENT

Many file formats in use today are so called "flat files" that do not include a concept of a "record". A "record", for the purposes of this discussion, includes sets of information which are intentionally grouped together (e.g. an aggregation of related pages). Examples of records include, published documents, brochures, postcards, flyers, images, tickets, coupons, instruction manuals, and so on. When such records are incorporated into a flat file, any records originally created, lose their separateness (i.e. lose their differentiation). Thus the record's "original format" is lost and there is no embedded information in the flat file which clearly identifies where one record ends and next one begins.

For example, if a Print Service Provider (PSP) receives a flat file print job that originally was intended to be a four page letter sent to two-thousand recipients, the flat file would not contain explicit information on where one letter ends and the next begins (e.g. is each record is a one page flyer being bulk-mailed to eight-thousand people, or perhaps an forty page booklet to be distributed to 200 targeted recipients). Lacking such information would easily yield errors during print production, such as in the example, where said forty page booklet is not bound together properly, but is instead output as a stack of 8000 individual sheets.

Currently, the way such record differentiation is restored is by requiring a person to visually inspect the flat file and figure out what the correct record size (e.g. number of sheets) is, so that the records can be properly printed. Such manual inspections can not only be error prone, but also add a significant delay to the print production process.

Legacy PDF (Portable Document Format) files exemplify a flat file structure. So while the PDF files typically differentiate between file pages and also include xobjects, such PDF files do not include any explicit record differentiators. However, due to the importance of understanding the records in such flat files, recently some new PDF-type formats, which include explicit record identifying information clearly defining which sets of pages make up which records, have been created or proposed. These include Personalized Print Mark-Up Language (PPML) formats, and a new PDF-VT format. Such new formats are useful for the future, but they do not address the problem of identifying records in legacy PDF files or in other types of flat files.

The present invention, however, teaches an automated process which addresses and remedies many, if not all, of the problems discussed above. The present invention restores the record differentiating information which was lost during the creation of the flat file. Automatic reconstruction of a flat file's record structure significantly improves the speed of print production processing, since manual record reconstruction is no longer required. Automatic record identification also improves record reconstruction accuracy.

Using this restored record-differentiating information, records within the flat file can now be properly and efficiently: verified, converted, routed, imposed, printed, and used for other enhanced functions as well.

Verification includes checking whether a manual record identification within the same flat file is accurate. Conversion includes translating legacy flat file formats into newer record differentiating formats (e.g. converting legacy PDF files into newer PPML and PDF-VT formats). Routing includes splitting the individual records and sending them into different workflows (e.g. RIPs, printing presses, finishing, and other print production steps) for additional processing and then correctly re-combining these separately processed records for final finishing, binding, or other output efforts. Imposition (i.e. literally means "in position") includes automatically arranging various pages within each record so that the pages will read consecutively when a set of the printed sheets are folded, duplex printed, and so on. Printing includes correctly rendering the records into a tangible print production output product.

The present invention's record differentiating techniques are particularly applicable to Variable Data Print (VDP) jobs which are generated from templates filled with customized data.

Details of the present invention are now discussed.

Figure 1:
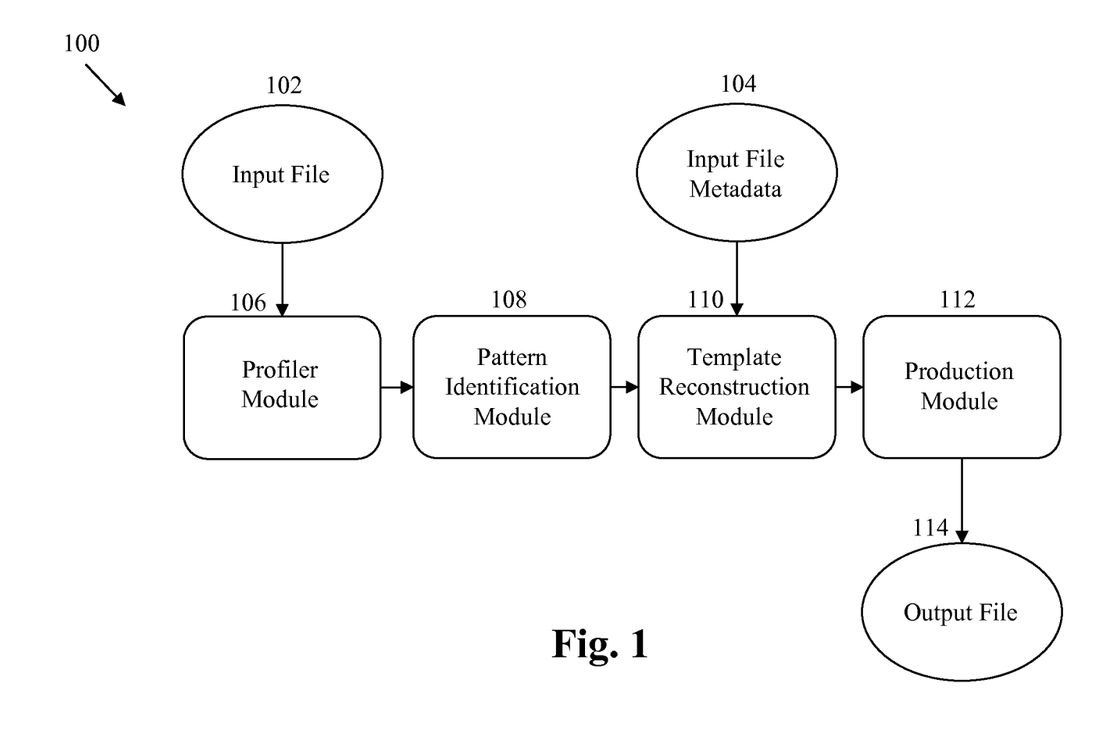
FIG. 1 is one embodiment of a system for identifying records within an input file.
Figure 2:
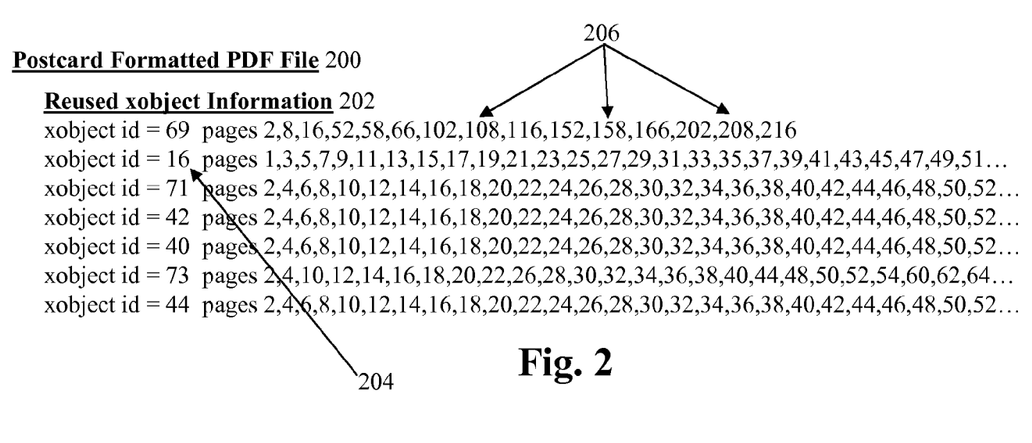
FIG. 2 is a data structure diagram of one embodiment of a postcard formatted PDF file.
Figure 3:
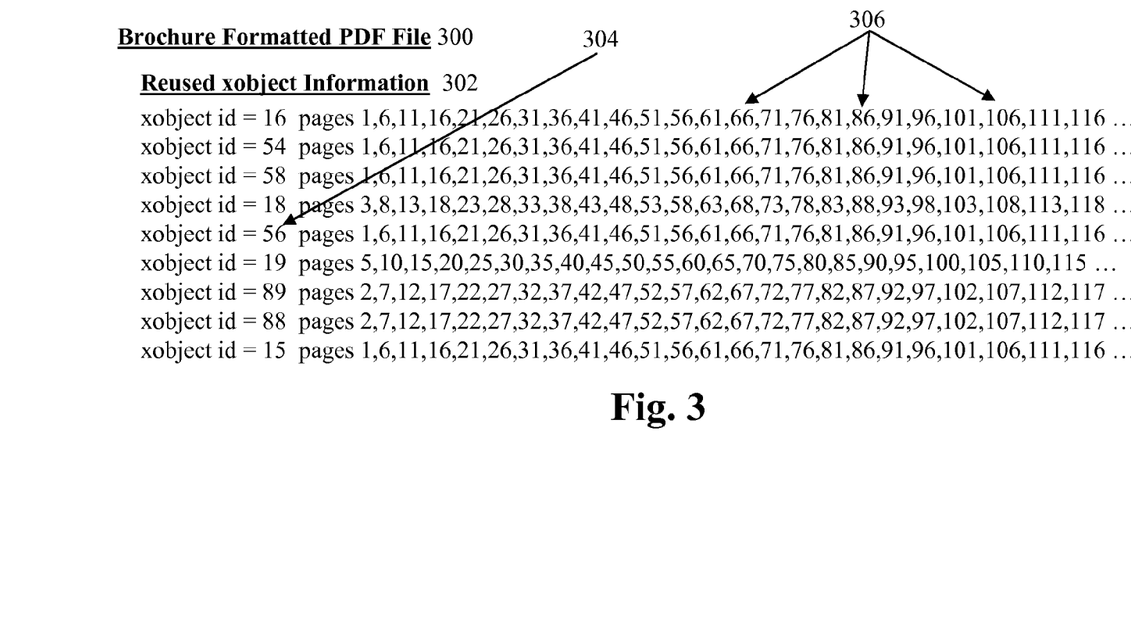
FIG. 3 is a data structure diagram of one embodiment of a brochure formatted PDF file.

FIG. 1 is one embodiment of a system 100 for identifying records within an input file 102. FIG. 2 is a data structure diagram of one embodiment of a postcard formatted PDF file 200. FIG. 3 is a data structure diagram of one embodiment of a brochure formatted PDF file 300. To facilitate understanding, FIGS. 1 through 3 are discussed together.

To begin, a profiler module 106, within the system 100, receives an input file 102. The input file 102 is herein defined as having many of the attributes and characteristics of a flat file. A flat file is herein defined as a file that does not include embedded structural information which "differentiates" one record from another record within the file. A record is herein defined as a set of fields which are selected, grouped, formatted, or organized according to a preexisting template or other formatting or design structure, and whose fields are typically populated with variable data. The variable data can be unique to various records, such as a specific unique address populating an address field.

Having been incorporated into the input file 102, any records, which were originally created separately, have become "undifferentiated", meaning that there are no longer unique embedded codes in the input file 102 which indicate where one record originally ended and another record originally began.

The input file 102, however, does include information identifying a set of objects, and how such objects are distributed over a set of pages within the input file 102. Objects are typically created by an application program to represent a set of information, such as: geometric shapes, groups of words, images, audio, video, code, etc. Objects are usually created to speed up certain processing, display, or rendering functions. For example, an application program may create an logo object for a "company logo" that is repeated in a header or footer of each page in a document. Instantiating a tag or pointer to the logo object in each header or footer is more efficient than rendering the entire logo anew each time it is to appear in the document.

A sub-set of these objects will be reused at least once more in the input file 102. For the purposes of this invention, at least two undifferentiated records containing reused objects are expected to be in the input file 102, so that the template which was originally used to create the records can be reconstructed, as will be discussed below.

An embodiment of the present invention is described wherein the input file 102 contains PDF (Portable Document Format) records constructed according to a template. PDF files are relatively flat files whose objects are called xobjects, that are distributed over a set of pages. These PDF files, however, do not include embedded codes which explicitly differentiate the original records included within the PDF file. FIGS. 2 and 3 show two example PDF formatted input files 102, one in a postcard format 200 and the other in a brochure format 300. Those skilled in the art recognize that many other formats are possible, and which can be processed by the present invention.

Accompanying the input file 102 is a set of input file metadata 104. The input file metadata 104 specifies one or more processing functions to perform on the input file 102, including: verification, conversion, routing, imposition, and printing. These different processing functions have been introduced above, but some specifics will be added later in this discussion.

The profiler module 106 then scans the input file 102 and identifies a set of objects in the input file 102 and the page upon which the object is located. Some of these objects may only be used once and appear only on one page in the input file For example, FIG. 2 shows a set of reused xobject information 202 identified within the postcard formatted PDF file 200. More specifically, the profiler module 106 has discovered at least seven xobject id numbers 204 that appear on multiple pages within the postcard formatted PDF file 200. These are xobjects: 69, 16, 71, 42, 40, 73 and 44. The pages 206 upon which these xobject id numbers 204 appear are also discovered by the profiler module 106. In this example, the xobjects that have not been reused are not shown.

Similarly, in FIG. 3 shows a set of reused xobject information 302 identified within the brochure formatted PDF file 300. More specifically, the profiler module 106 has discovered at least nine xobject id numbers 304 that appear on multiple pages within the brochure formatted PDF file 300. These are xobjects: 16, 54, 58, 18, 56, 19, 89, 88 and 15. The pages 306 upon which these xobject id numbers 304 appear are also discovered by the profiler module 106. Also in this example, the xobjects that have not been reused are not shown.

Next, the pattern identification module 108 computes a page distance between adjacent instances of each reused object in the set of objects discovered by the profiler module 106 in the input file 102. The pattern identification module 108 then generates an object recurrence pattern for each of the reused objects by recognizing recurrent patterns between the page distances for the reused object.

For example, in FIG. 2 the page distance between adjacent instances of xobject 69 is: 6, 8, 36, 6, 8, 36 . . . repeating, so the pattern identification module 108 identifies a "6, 8, 36" object recurrence pattern. The page distance between adjacent instances of xobject 16 is: 2, 2, 2, 2, . . . repeating. There is also a 2, 2, 2, 2, . . . repeating pattern for xobjects: 71, 42, 40 and 44. So the pattern identification module 108 identifies a "2" object recurrence pattern for xobjects: 16, 71, 42, 40 and 44. However, the page distance between adjacent instances of xobject 73 is: 2, 6, 2, 2, 2, 2, 2, 2, 4, 2, 2, . . . and so, not repeating. In this case, the pattern identification module 108 does not associate any recognizable object recurrence pattern with xobject 73.

In FIG. 3, the page distance between adjacent instances of xobject 16 is: 5, 5, 5, 5, . . . repeating, so the pattern identification module 108 identifies a "5" object recurrence pattern. The pattern identification module 108 also identifies a "5" object recurrence pattern for all the rest of the xobjects as well (i.e. 54, 58, 18, 56, 19, 89, 88, and 15).

Next, the template reconstruction module 110 searches the set of object recurrence patterns, identified by the pattern identification module 108, for one or more objects that would be a "good candidate" for reconstructing a template used to create the records in the input file 102.

In one embodiment of the present invention, the template reconstruction module 110 identifies objects which would be a "good candidate" according to the following three primary "good candidate criteria":

1) Existence of "any" Object Recurrence Pattern:
   For example, all of the xobjects in FIG. 2 had an identifiable object recurrence pattern, except for xobject 73, which had no recognizable object recurrence pattern); and
   In FIG. 3, all of the xobjects had an identifiable object recurrence pattern.

2) Object Recurrence Patterns which Repeat Through a "Greater Percentage" of the Input File 102 are Preferred Over Those in a "Small Percentage" of the Input File 102:
   For example, in FIG. 2, if the input file 102 has 216 pages, and the other xobjects with recurrence patterns repeat all the way up to page 216, then such xobjects repeat through 100% of the input file 102; and
   However, in FIG. 2, if the input file 102 has about 500 pages, and all of the xobjects, except xobject 69, which have recurrence patterns repeat up until page 500, then xobject 69 would not be a good candidate since is stops repeating at page 216, but the other repeating xobjects would be better candidates.

3) Objects Sharing the Same Recurrence Pattern with a Greater Number of Objects are Preferred Over Those Objects Sharing a Recurrence Pattern with Fewer Object:
   For example, in FIG. 2, xobjects: 16, 71, 42, 40 and 44 each share the same "2" object recurrence pattern, thus these xobjects are better candidates that xobject 69 which does not share a recurrence pattern with any of the other xobjects.

Next, the template reconstruction module 110 assigns a "confidence level" to each of the objects based on their "good candidate criteria". Objects which meet a greater number of the "good candidate criteria" are assigned a higher "confidence level", than those objects which meet fewer of the "good candidate criteria". For example, xobjects 16, 71, 42, 40 and 44 in FIG. 2 meet all three of the "good candidate criteria" discussed above and thus would be assigned a 100% "confidence level" in one embodiment of the present invention. Similarly, in FIG. 3, xobjects 54, 58, 18, 56, 19, 89, 88, and 15 also meet all three of the "good candidate criteria" discussed above and thus would be assigned a 100% "confidence level" in one embodiment of the present invention.

In an alternate embodiment of the present invention an input file 102 which included both the postcard formatted PDF file 200 and the brochure formatted PDF file 300 concatenated together, the template reconstruction module 110 would "split" the "confidence level" into a first "100% confidence level" for that percentage of the input file 102 made of the postcard formatted PDF file 200, and a second "100% confidence level" for that percentage of the input file 102 made of the brochure formatted PDF file 300.

The template reconstruction module 110 then reconstructs the template size which was lost when the records were originally incorporated into the input file 102. The template size is equal to the recurrence pattern of an object having a higher, and preferably highest, "confidence level". For example, in FIG. 2, xobject 16 has one of the higher confidence levels and a "2" recurrence pattern. Thus the template reconstruction module 110 would infer that the input file 102 containing the postcard formatted PDF file 200 was created using a 2-page template. In FIG. 3, xobject 54 has one of the higher confidence levels and a "5" recurrence pattern. Thus the template reconstruction module 110 would infer that the input file 102 containing the brochure formatted PDF file 300 was created using a 5-page template.

Knowing the template size, the template reconstruction module 110 can then calculate how many records are included in the input file 102, by dividing the total number of pages in the input file 102 by the template size (i.e. page length). For example, if the postcard formatted PDF file 200 was 2000 pages long, then the template reconstruction module 110 would divide 2000 by the 2-page template size, and calculate that the file 200 included 1000 records, each 2-pages long. Similarly, if the brochure formatted PDF file 300 was 2000 pages long, then the template reconstruction module 110 would divide 2000 by the 5-page template size, and calculate that the file 300 included 400 records, each 5-pages long.

If however, the template reconstruction module 110 can not identify any "good candidates" or if the "confidence level" is below a preprogrammed threshold, then the template reconstruction module 110 outputs a signal indicating that any records within the input file 102 can not be automatically differentiated, and that a manual differentiation must instead be used.

The production module 112 receives the template size information and the set of object recurrence patterns from the template reconstruction module 110. The production module 112 also receives information from the input file metadata 104, specifying the one or more processing functions to perform on the input file 102 (i.e. verification, conversion, routing, imposition, printing, and so on) which were introduced above. Some of the benefit of having reconstructed the template size using the present invention are now presented with respect to these different processing functions. Those skilled in the art will know of other benefits to which the reconstructed template may be applied as well.

When the production module 112 is asked to perform a "verification" function on the input file 102, the production module 112 receives a manually reconstructed template (which in one embodiment is stored in the input file metadata 104) and compares the manually reconstructed template to the template automatically reconstructed by the template reconstruction module 110. If the two templates match, the production module 112 will include an agreement signal in an output file 114. The output file 114 is then additionally processed, perhaps by displaying the agreement signal to a Print Service Provider (PSP). If, however, the two templates do not match, the production module 112 will include an error signal in the output file 114, "raise a warning", and also ask the PSP to recheck the manually identified record length.

When the production module 112 is asked to perform a "conversion" function on the input file 102, the production module 112 receives an output file 114 final format specification, such as PPML or PDF-VT, and uses the template size to embed record codes in the input file 102, indicating where one record ends and another record begins, thereby generating a new output file 114 according to the final format specification.

When the production module 112 is asked to perform a "routing" function on the input file 102, the production module 112 automatically individually routes one or more reconstructed records in the input file 102 to a correct print production workflow or perhaps a hot-folder. Such record routing enables a complete set of pages for each differentiated record within a print job to be routed different RIPs, print production presses, finishing, and record recombining and binding steps, thereby greatly simplifying and automating many print production processes for the input file 102.

When the production module 112 is asked to perform an "imposition" function on the input file 102, the production module 112 uses the template size information to generate a recommended page imposition for each record, which is then submitted to a PSP for approval. "Imposition" (a.k.a. "in position") is a process of arranging a record's pages for printing so that the pages will read consecutively after the record is single-side or duplex printed, rotated, folded, cut, bound, and so on. In an alternate embodiment, the production module 112 uses known imposition techniques to automatically reformat the input file 102 for print production.

Such recommended and automatic impositions can be further enhanced if the input file metadata 104 contains information on the "type", "overall format", or "output layout" of the records in the input file 102. In some cases the proper "output format" of the records in the input file 102 can be inferred based on the recurrent pattern of the object.

For example, in FIG. 2, xobject 16 is painted on every "odd" page, whereas xobject 71 is painted on every "even" page. This is a well known "even/odd" pattern typically of "coupons" or "postcards" (e.g. the postcard formatted PDF file 200). With this "output format" the production module 112 would recommend duplex printing, with the "odd" page painted objects on one side of the paper, and the "even" page painted objects on the opposite side of the paper, so that the coupon or postcard could be properly printed.

The production module 112 will also add blank pages to each record as necessary as part of the imposition process. For example, in FIG. 3, the record adheres to a "5-page" template. If these 5-page records are to be folded into a brochure, then the production module 112 will insert a blank page so that the record can be properly printed, cut, and folded. To save resources, the production module 112 can also alter the "finishing" of the inserted page, perhaps by deleting a costly gloss, or UV coating step. Otherwise, not knowing that the input file 102 contains 5-page records could result in a severe error, since then a first page of a next record could otherwise be imposed with the last page of a previous record.

When the production module 112 is asked to perform a basic "printing" function on the input file 102, the production module 112 can, in addition to the print production effects described above, halt printing when information is received that a printer does not have the resource capacity to complete processing of an individual record (e.g. if a printer on only had 5 sheets of paper left, but the record size is 10 pages) thereby reducing waste.

Figure 4:
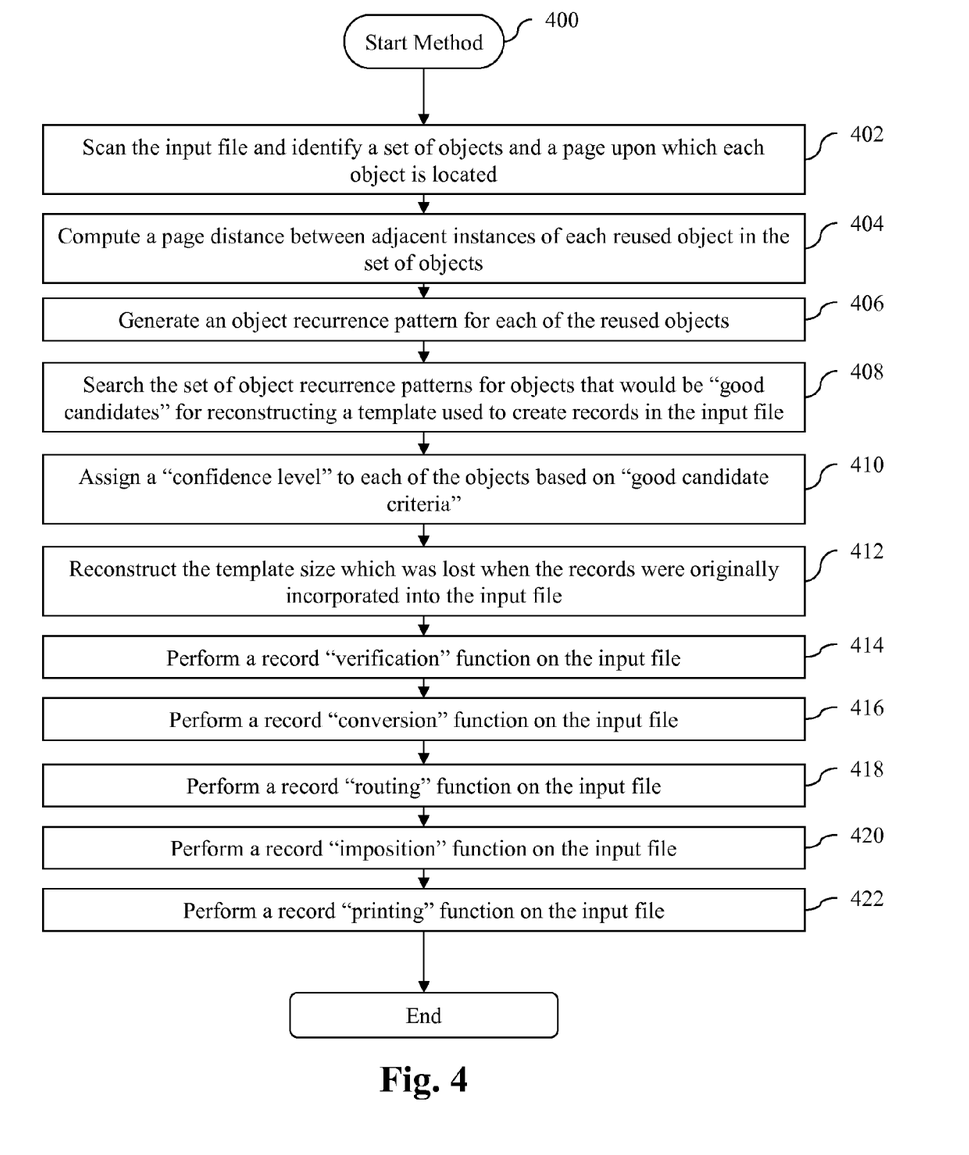
FIG. 4 is a flowchart of one embodiment of a method for identifying records within an input file.

FIG. 4 is a flowchart of one embodiment of a method 400 for identifying records within an input file 102. Those skilled in the art will recognize that while one embodiment of the present invention's method is now discussed, the material in this specification can be combined in a variety of ways to yield other embodiments as well. The method steps next discussed are to be understood within a context provided by this and other portions of this detailed description.

The method 400 begins in step 402, where the profiler module 106 scans the input file 102 and identifies a set of objects and the page upon which each object is located. Next, in step 404, the pattern identification module 108 computes a page distance between adjacent instances of each reused object in the set of objects. In step 406, the pattern identification module 108 generates an object recurrence pattern for each of the reused objects.

Then in step 408, the template reconstruction module 110 searches the set of object recurrence patterns for one or more objects that would be a "good candidate" for reconstructing a template used to create the records in the input file 102. Next in step 410, the template reconstruction module 110 assigns a "confidence level" to each of the objects based on their "good candidate criteria". In step 412, the template reconstruction module 110 then reconstructs the template size which was lost when the records were originally incorporated into the input file 102.

In step 414, the production module 112 performs a record "verification" function on the input file 102, in response to a first set of criteria in the input file metadata 104. Then in step 416, the production module 112 performs a record "conversion" function on the input file 102, in response to a second set of criteria in the input file metadata 104. Then in step 418, the production module 112 performs a record "routing" function on the input file 102, in response to a third set of criteria in the input file metadata 104. Then in step 420, the production module 112 performs a record "imposition" function on the input file 102, in response to a fourth set of criteria in the input file metadata 104. Then in step 422, the production module 112 performs a record "printing" function on the input file 102, in response to a fifth set of criteria in the input file metadata 104.

A set of files refers to any collection of files, such as a directory of files. A "file" can refer to any data item (e.g., a record, a document, a bitmap, an image, an audio clip, a video clip, software source code, software executable code, etc.). A "file" can also refer to a directory (a structure that contains other files).

Instructions of software described above are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. An article of manufacture comprising at least one non-transitory computer-readable storage medium containing computer instructions for identifying records within an input file by performing a method comprising:
    identifying, in the input file, a reused object and a set of pages upon which the reused object is located;
    based upon the set of pages identified, computing a page distance between at least two adjacent recurring instances of the reused object, the page distance equal to a number of pages between the at least two adjacent recurring instances of the reused object;
    based upon the page distance that has been computed, generating an object recurrence pattern for the reused object; and
    based upon analysis of the object recurrence pattern for the reused object that has been generated, reconstructing a record template, thereby identifying the records in the input file.

2. The article of manufacture of claim 1, wherein reconstructing the record template comprises:
    setting a page length for the record template equal to the object recurrence pattern, the page length equal to a number of a pages.

3. The instructions article of manufacture of claim 1, wherein the method further comprises:
    calculating a total number of records in the input file, by dividing a total number of pages in the input file by a page length of the record template.

4. The article of manufacture of claim 1,
    wherein identifying the reused object and the set of pages comprises identifying a set of reused objects and a corresponding set of pages upon which the reused objects are located,
    wherein computing the page distance comprises computing page distances between adjacent recurring instances of the reused objects,
    wherein generating the object recurrence pattern comprises generating object recurrence patterns for the reused objects,
    wherein the method further comprises searching the object recurrence patterns for one or more reused objects that are candidates for reconstructing the record template, and wherein reconstructing the record template comprises reconstructing the record template, based on analysis of the object recurrence pattern for at least one of the candidate reused objects.

5. The article of manufacture of claim 4, wherein searching the object recurrence patterns comprises:
selecting a first reused object as a better candidate than a second reused object, if one or more of the following criteria are met:
the first reused object has an object recurrence pattern, but the second reused object does not have an object recurrence pattern;
the first reused object recurrence pattern repeats through a greater percentage of the input file than does the second reused object recurrence pattern; and
the first reused object shares a same recurrence pattern with a greater number of other reused objects than does the second reused object.

6. The article of manufacture of claim 5,
wherein the method further comprises assigning a higher confidence level to those reused objects which meet a greater number of the criteria; and
wherein reconstructing the record template further comprises reconstructing the record template, based on analysis of the object recurrence pattern for the reused object having a highest confidence level.

7. The article of manufacture of claim 6, wherein the method further comprises:
indicating that the record template must be manually reconstructed, if no candidate reused object can be identified, or if the "confidence level" is below a preprogrammed threshold.

8. The article of manufacture of claim 4, wherein reconstructing the record template further comprises:
reconstructing the record template for a first portion of the input file, based on the object recurrence pattern for a first candidate reused object; and
reconstructing the record template for a second portion of the input file, based on the object recurrence pattern for a second candidate reused object.

9. The article of manufacture of claim 1, wherein the input file includes one from a group of the following attributes:
the input file does not contain embedded information which explicitly identifies where one record ends and next one begins;
the input file is a Portable Document Formatted (PDF) file, having objects called xobjects;
the input file is a Variable Data Print (VDP) file; and
the input file is a flat file.

10. The article of manufacture of claim 1,
wherein the input file includes one from a group including: a document, a brochure, a postcard, a flyer, an image, a ticket, and a coupon.

11. The article of manufacture of claim 1,
wherein the reused object includes one from a group including: a geometric shape, a group of words, an image, an audio clip, a video clip, and computer code.

12. The article of manufacture of claim 1, wherein the method further comprises:
comparing the reconstructed record template to a manually identified record template; and
verifying whether the reconstructed record template and manually identified record template are equivalent.

13. The article of manufacture of claim 1, wherein the method further comprises:
using the record template to convert the input file into a new file format having embedded record codes which indicate where one record ends and another record begins in the input file.

14. The article of manufacture of claim 1,
wherein the input file is formatted as a PDF file; and
wherein the method further comprises using the record template to convert the PDF input file into one from a group including: a PPML file; and a PDF-VT file.

15. The article of manufacture of claim 1, wherein the method further comprises:
routing individual records within the input file to one from a group including: a RIP, a print production workflow, a hot-folder, a press, a finishing step, a coating step, a record recombining step, and a record binding step.

16. The article of manufacture of claim 1, wherein the method further comprises one of:
generating a recommended imposition for each record, based on the record template;
automatically imposing each record, based on the record template; and
inserting blank pages into a record to effect a correct imposition.

17. The article of manufacture of claim 1, wherein the method further comprises:
halting printing of a record when a page length of the record exceeds a resource capacity of a print production process.

18. The article of manufacture of claim 1, wherein identifying the reused object and the set of pages comprises:
locating each of one or more pages on which the reused object appears; and
adding each of the one or more pages on which the reused object appears as one of the set of pages upon which the reused object is located,
wherein the reused object appears more than once within the set of pages.

19. The article of manufacture of claim 1, wherein the method further comprises:
analyzing the object recurrence pattern for the reused object on which basis the record template is reconstructed, by assessing the reused object in accordance with a good candidate criteria, the good candidate criteria specifying that the reused object is a good candidate on which basis the record template should be reconstructed.

20. The article of manufacture of claim 19, wherein the good candidate criteria comprise the reused object being one of any recurring object within the input file, such that any recurring object including the reused object is a good candidate on which basis the record template should be reconstructed.

21. The article of manufacture of claim 19, wherein the good candidate criteria comprise the reused object being repeated within a percentage of a plurality of pages of the input file greater than a threshold percentage and as such is a good candidate on which basis the record template should be reconstructed.

22. The article of manufacture of claim 19, wherein the good candidate criteria comprise the reused object being repeated a number of times within the input file greater than a threshold number of times and as such is a good candidate on which basis the record template should be reconstructed.

23. A system for identifying records within an input file, comprising:

a processor configured to operate a series of modules, wherein the modules comprise:
  a profiler module for identifying, in the input file, a reused object and a set of pages upon which the reused object is located;
  a pattern identification module for:
    based upon the set of pages identified, computing a page distance between at least two adjacent recurring instances of the reused object, the page distance equal to a number of pages between the at least two adjacent recurring instances of the reused object; and
    based upon the page distance that has been computed, generating an object recurrence pattern for the reused object; and
  a template reconstruction module for reconstructing a record template, based on an analysis of the object recurrence pattern for the reused object that has been generated, thereby identifying the records in the input file.

24. The system of claim 23, further comprising:
  a production module for effecting on the input file one from a group including: verification, conversion, routing, imposition, and printing.

25. A method, executed by a computer, for identifying records within an input file, comprising:
  identifying, in the input file, a reused object and a set of pages upon which the reused object is located;
  based upon the set of pages identified, computing a page distance between at least two adjacent recurring instances of the reused object, the page distance equal to a number of pages between the at least two adjacent recurring instances of the reused object;
  based upon the page distance that has been computed, generating an object recurrence pattern for the reused object; and
  based upon analysis of the object recurrence pattern for the reused object that has been generated, reconstructing a record template, thereby identifying the records in the input file.

* * * * *

UNITED STATES PATENT AND TRADEMARK OFFICE
CERTIFICATE OF CORRECTION

| | |
|---|---|
| PATENT NO. | : 8,411,305 B2 |
| APPLICATION NO. | : 12/606682 |
| DATED | : April 2, 2013 |
| INVENTOR(S) | : Fabio Giannetti |

It is certified that error appears in the above-identified patent and that said Letters Patent is hereby corrected as shown below:

In the Claims

In column 8, line 48, in Claim 3, delete "The instructions" and insert -- The --, therefor.

Signed and Sealed this
Thirteenth Day of August, 2013

Teresa Stanek Rea
*Acting Director of the United States Patent and Trademark Office*